United States Patent
Jones et al.

[11] 3,877,875
[45] Apr. 15, 1975

[54] NITROGEN CONSTITUENT ANALYSIS

[75] Inventors: Robert H. Jones, Fullerton; Michael B. Johnston, Anaheim, both of Calif.

[73] Assignee: Beckman Instruments, Inc., Fullerton, Calif.

[22] Filed: July 19, 1973

[21] Appl. No.: 380,740

[52] U.S. Cl......... 23/230 PC; 23/253 PC; 23/232 R; 23/254 R
[51] Int. Cl. .......................................... G01n 25/22
[58] Field of Search.......... 23/230 PC, 253 PC, 232, 23/254

[56] References Cited
UNITED STATES PATENTS

| | | | |
|---|---|---|---|
| 3,241,922 | 3/1966 | Walisch ........................ | 23/253 PC |
| 3,304,159 | 2/1967 | Hinsvark ....................... | 23/253 PC |
| 3,410,662 | 11/1968 | Murphy ......................... | 23/230 PC |
| 3,451,779 | 6/1969 | Hozumi ......................... | 23/253 PC |
| 3,565,583 | 2/1971 | McNulty et al. ............... | 23/230 PC |
| 3,698,869 | 10/1972 | Condon ......................... | 23/230 PC |

*Primary Examiner*—R. E. Serwin
*Attorney, Agent, or Firm*—R. J. Steinmeyer; P. R. Harder

[57] ABSTRACT

A unitary system is provided with separate channels for detecting and analyzing different types of nitrogen-containing compounds, particularly those which may be encountered in waste treatment or in pollution control or in food product analysis. The channels are so designed that an injected sample is acted upon in gaseous or suspended form, with reaction products thereof carried through the system by carried gas and ultimately converted to nitric oxide for analysis in a nitric oxide analyzer. Each channel contains reaction columns packed with a suitable substance. There is a total combined nitrogen channel in which a sample is first catalytically oxidized to form nitric oxides. In a nitrite-nitrate nitrogen channel a sample is first treated to form nitrites and injected into a reaction column packed with an acidifying substance and in an ammonia nitrogen channel the sample is injected into a reaction column packed with an alkalyzer before proceeding to a reaction column packed to catalytically oxidize the resulting ammonia to nitrogen dioxide and nitric oxide. In a modified embodiment a suitably pretreated sample suspected of cyanide content may also ultimately be converted to nitric oxide for analysis.

72 Claims, 6 Drawing Figures

NITROGEN CONSTITUENT ANALYSIS

BACKGROUND OF THE INVENTION

1. Field of Invention

This invention relates to the determination of nitrogen and, more particularly, to improved methods and apparatus for determining nitrogen in aqueous solutions, in aqueous or organic extracts and in solids.

2. Definitions

As used herein the following definitions are intended.

Total Combined Nitrogen means the nitrogen content combined with other elements in certain organic and inorganic compounds.

Total Kjeldahl Nitrogen means the nitrogen existing in certain organic compounds and in ammonia and ammonium compounds.

Organic Kjeldahl Nitrogen or Organic Nitrogen means the nitrogen existing combined in organic compounds.

Ammonia Nitrogen means the nitrogen content of free ammonia and inorganic ammonium compounds.

Nitrite Nitrogen means the nitrogen existing in inorganic compounds containing the nitrate ($NO_2^-$) radical.

Nitrate Nitrogen means the nitrogen existing in organic compounds containing the nitrate ($NO_3^-$) radical.

Combined Nitrate-Nitrite Nitrogen is nitrogen from a mixture of nitrites and nitrates without distinguishment of the parent species.

BACKGROUND

Analysis of the various forms of nitrogen are among the most important of analytical measurements. In waste water treatment processes, nitrogen enters the water in human and animal excretement as organic compounds such, for example, as proteins, peptides and amino acids. Nitrogen also enters the waters in organic and inorganic forms from industrial wastes. In biological treatment processes, the organic nitrogen is converted by bacterial action to ammonia nitrogen. Other bacteria convert the ammonia nitrogen to nitrite nitrogen and finally to nitrate nitrogen. Nitrates are nutrients for algal growth and hence are not desirable in effluent waters.

Two unit processes are commonly used in waste treatment plants for the removal of inorganic nitrogen forms. In one process called ammonia stripping, the pH of the waste water is raised and ammonia is purged from the waste water by air stripping. A second process, called denitrification, is used to remove nitrate nitrogen. In this process, the waste water is allowed to go septic, that is, devoid of dissolved oxygen, and a source of organic carbon, usually in the form of methanol, is added. Under bacterial action, oxygen from the nitrate ion converts the carbon and hydrogen in methanol to $CO_2$ and $H_2O$. The nitrogen in the nitrate ion is converted to gaseous nitrogen. If nitrate nitrogen exists in the waste water and denitrification is not employed, a serious pollution problem can arise. In the secondary sedimentation process, some biodegradable carbon will exist in the sludge and natural denitrification will take place. The released nitrogen forms gas bubbles which rise to the surface carrying some of the sludge in the settling tank with it and this sludge is then carried out into the receiving water with the effluent.

The analysis of total combined nitrogen and/or organic nitrogen in waste water treatment plants gives the operator knowledge of the nitrogen load of the waste being treated. Ammonia nitrogen analysis can also be used to implement and control ammonia stripping and nitrite-nitrate analysis can be used in the control of the denitrification process.

In receiving waters, three forms of nitrogen are routinely measured. Organic Kjeldahl nitrogen analysis is an indication of the pollution in the receiving waters. The presence of ammonia is taken as direct evidence of recent pollution. Nitrate in the receiving water is of interest because it is an indication of the nutrient available for algal growth. As further evidence of the importance of nitrogen analysis, it should be noted that discharge permits issued by the Corps of Engineers require Kjeldahl nitrogen, ammonia nitrogen and nitrate nitrogen analysis by all permit applicants and periodic analysis by permit holders.

In addition to the many water pollution applications described above, there are many other applications for methods and apparatus which can measure various forms of nitrogen. For example Kjeldahl nitrogen analysis is widely utilized in the determination of protein content of foods. The "Official Methods of Analysis of the Association of Official Analytical Chemists" lists methods of nitrogen analysis in such products as: bread, cocoa products, cheese, color additives, confectionary products, cream, cyanamide, food dressings, egg and egg products, evaporated milk, feeds, fertilizers, fish and other marine products, gelatin, gelatin dessert products, honey, ice cream and frozen desserts, macaroni and similar products, malt, mayonaisse, meat and meat products, meat extracts, milk, mineral waters, molasses, plants, mustard, spices, soy bean flour, starch products, sugar and sugar products, tobacco, wheat, rye, barley, rice, corn, oats, wheat flour and wort.

Nitrogen analysis should be of importance in all fermentation processes since nitrogen is a part of bacteria cells and must be provided in nutrients. Nitrogen analyses are also made in refineries since crude oil contains various nitrogen compounds.

PRIOR ART

Instrumentation currently exists for making various nitrogen analyses. Kjeldahl analysis is performed on one laboratory instrument by heat and catalytic conversion of the combined form of nitrogen to gaseous nitrogen which is then measured volumetrically. Total Kjeldahl nitrogen may be measured on another instrument by automating the acid digestion process and by colorimetric analysis of the resulting ammonia compounds. Another instrument measures nitrate-nitrite nitrogen by catalytically reducing these compounds to ammonia and coulometrically titrating the ammonia. Specific ion electrodes have been used for nitrate and ammonia analysis but without great commercial success because of their lack of sensitivity.

SUMMARY OF THE INVENTION

The present invention makes possible the rapid determination of various forms of nitrogen by converting the nitrogen contained in various compounds to nitric oxide and measurement of the nitric oxide by one of a variety of instruments. Various sample handling and treatment arrangements make possible the distinguishment of the various species of nitrogen when there are several species within the same sample.

In carrying out the invention in accordance with a preferred form of an embodiment thereof separate analysis channels are provided for detecting and measuring total combined nitrogen, nitrite-nitrate nitrogen and ammonia nitrogen. In each channel a portion of the sample is injected into a reaction column which has been packed with an appropriate substance for converting the sample to a form which can be ultimately converted to nitric oxide in a subsequent combustion tube for measurement in a nitric oxide analyzer. A pressurized carrier gas source is provided for carrying the sample through the successive combustion tubes to the nitric oxide analyzer.

In the total combined nitrogen channel the initial reaction column is packed with cupric oxide for converting the sample to oxides of nitrogen and a subsequent conversion tube is employed for reducing any nitrogen dioxide to nitric oxide. In fact in each channel the final reaction tube is utilized for reducing nitrogen dioxide to nitric oxide for measurement in a nitric oxide analyzer. In the nitrite-nitrate channel the first reaction tube is packed with phosphoric acid coated packing and the sample is first treated to convert all of the nitrates to nitrites. In the ammonia nitrogen channel two successive columns are employed before the final conversion tube. The first reaction tube is packed with magnesium oxide or other alkalyzer for converting the ammonium nitrogen to ammonia, later converted to oxides of nitrogen which are subsequently reduced in the final tube to nitric oxide.

A better understanding of the invention will be afforded by the following detailed description when considered in conjunction with the accompanying drawings.

DRAWINGS

In the drawing

Like reference characters are utilized throughout the drawing to designate like parts.

DESCRIPTION OF THE INVENTION

Before describing the invention in detail an understanding of the reactions of nitrogen-bearing compounds will be helpful. In particular, consideration should be given to the reactions of the various species of nitrogen compounds to yield the nitric oxide (NO) to be detected by the analytical device or devices employed in the analysis.

ORGANIC NITROGEN COMPOUNDS

The number of organic nitrogen compounds is, of course, infinite. These compounds, however, always contain the elements carbon, hydrogen and nitrogen. The reaction upon which the method and apparatus of the present invention is based can generally be illustrated by considering a compound containing only carbon, hydrogen and nitrogen when catalytically combusted with oxygen at high temperature. It should be understood, however, depending upon the particular organic nitrogen compound being analyzed other elements such, for example, as oxygen, sulfur, phosphorous, and various halogens, to name only a few, may be present.

The general reaction may be illustrated as follows:

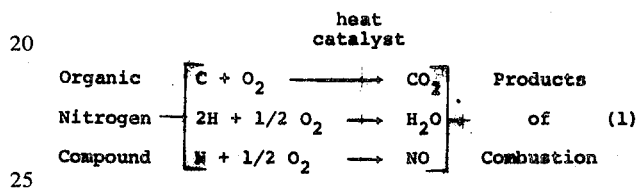

More specifically, the reaction may be illustrated by the following compounds which are of particular interest in waste treatment processes:

Urea $$2NH_2CONH_2 + 5O_2 \quad 2CO_2 + 4NO + 4H_2O \quad (2)$$

Pyradine $$4C_5H_5N + 27O_2 \quad 20CO_2 + 4NO + 10H_2O \quad (3)$$

It should be understood that not all organic nitrogen compounds will have their nitrogen quantitatively converted to nitric oxide which can be measured by the methods and apparatus disclosed hereinafter. From the samples tested and from inferences based upon the oxidation level of nitrogen in the various structures, tri-negative nitrogen is converted quantitatively to nitric oxide. Therefore, it is believed that essentially all naturally occurring organic nitrogen compounds will have their nitrogen quantitatively converted to nitric oxide which is measurable. This includes proteins, peptides, amino acids, amines, amides and heterocyclic compounds. Many of the industrially important nitrogen compounds are also measurable, including nitro compounds, nitriles, amines and amides. Among those compounds in which nitrogen is not quantitatively converted are nitroso compounds (industrially unimportant), azo compounds (important in the textile industry), diazo compounds, azides, and hydrazine. The latter four compounds are generally unstable and yield both nitrogen and nitrogen oxides upon oxidation.

TOTAL COMBINED NITROGEN

Figure 1:
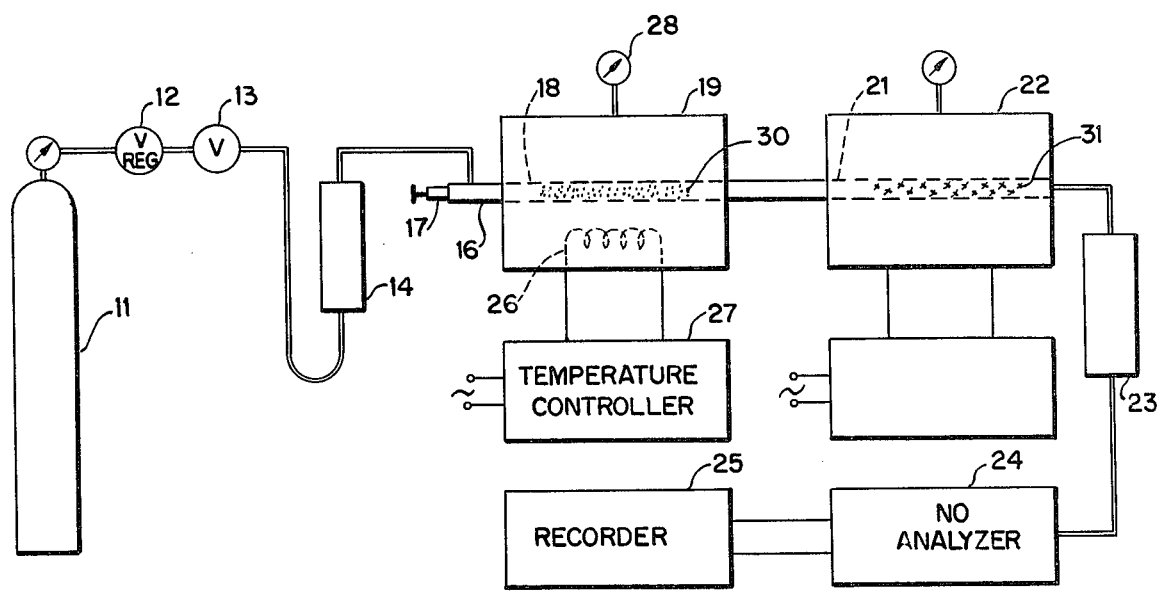
FIG. 1 is a schematic diagram of apparatus for analyzing total combined nitrogen.

Referring now to the drawings and more particularly to FIG. 1 thereof there is illustrated apparatus suitable for use in the determination of total combined nitrogen through the conversion of the nitrogen contained in both organic and inorganic compounds into nitric oxide which is then measured. A suitable source of regulated carrier gas is provided by a pressurized container 11, pressure regulator 12, flow control valve 13 and flowmeter 14 and the associated tubing interconnecting these elements in seriatim. Although carbon dioxide is preferred as a carrier gas, any other inert gas such as nitrogen, helium, or argon may be used.

The remainder of the system comprises a sample injection means 16 which is located at the inlet of a reaction tube 18 contained in furnace 19, a second reaction tube 21 located in furnace 22, a condenser 23 and a nitric oxide analyzer 24 interconnected in seriatim by appropriate tubing. For aqueous solutions the injection means may include a syringe 17. The analyzer 24 may be any one of a number of instruments which provide an electrical signal output having an amplitude proportional to the concentration of nitric oxide introduced thereto. A curve-drawing instrument or recorder 25 may be connected to the analyzer 24.

The furnaces 19 and 22 are substantially identical and may be heated by any suitable means such as electric heating element 26 which is regulated by means of a variable temperature controller 27 connected to any suitable electrical source. The temperature within the furnace may be determined and indicated by any suitable means 28 such, for example, as a pyrometer. The reaction tubes may be constructed of quartz or any other suitable high temperature resistant material such as ceramic or certain metals. Reference may be made to U.S. Pat. No. 3,296,435 for a description of a suitable construction of a combustion tube and an aqueous sample injection means.

Reaction tube 18 is packed with an appropriate catalyst 30 and copper oxide is preferred. Other catalysts such as platinum, rhodium, palladium, cobalt oxide, nickel oxide may be utilized but if one of these catalysts is used it may be necessary for the carrier gas to contain oxygen in order to obtain complete oxidation of the nitrogen contained in the sample.

Reaction tube 21 in combination with furnace 22 forms a suitable converter for the conversion of nitrogen dioxide to nitric oxide to which the analyzer is sensitized. If the temperature of furnace 22 is maintained at or above 1,000°C, the quartz reaction tube is all that is needed to provide the nitrogen dioxide, nitric oxide conversion. If it is desirable to operate at lower temperatures the combustion tube 21 may be packed with an appropriate catalyst 31 to cause this conversion at lower temperatures as described in the copending application of Radhakrishna M. Neti, Ser. No. 263,543, filed June 16, 1972. Vitreous carbon such as Beckwith Carbon Corporation's M-30 Powder, is found to be a suitable catalyst at an operating temperature of about 550°C.

As has been previously indicated, analyzer 24 may be any suitable analyzer which is specific to nitric oxide. A chemiluminescent analyzer such as that disclosed in U.S. Pat. No. 3,692,485 is preferred. Infrared analyzers such as the Model 865 or 315B Infrared Analyzers manufactured by Beckman Instruments, Inc. having their detection cells sensitized to nitric oxide may also be used.

OPERATION OF TOTAL COMBINED NITROGEN CHANNEL

Carrier gas from the cylinder 11 flows through the pressure regulator 12 and is flow-controlled by the needle valve 13 and flow rate is measured by the flowmeter or rotameter 14. Carrier gas flow is continuous through the system. The carrier gas flow enters the combustion tube 18 through the sample injector 16 into which the sample has been injected from the syringe 17 so that the gas flow carries the reaction products of the sample through the system. The sample heated in the furnace 19 in contact with the catalyst in the column 30 converts the combined nitrogen to oxides of nitrogen, nitrogen dioxide and nitric oxide.

After passage through the combustion tube 18, the gas with the entrained sample reaction products flow through a second column 21 which contains the reducing catalyst to convert nitrogen dioxide to nitric oxide. Thereupon the exit gas is passed through the condenser 23 for removal of excess water vapor.

The gas, having been cooled by passage through the condenser 23 and the connecting tubing, flows to the nitric oxide analyzer 24.

The combined nitrogen occurs in solution or possibly in suspension in water in case a solid sample has been ground to finely divided form and stirred into water. The water in the aqueous sample or the solvent in case a dissolved sample is employed is immediately vaporized and the organically bound nitrogen in the sample is converted to nitric oxide and nitrogen dioxide. Any nitrogen in the sample existing in the inorganic form as nitrate or nitrite ions is converted by thermal decomposition to nitric oxide or nitrogen dioxide. Any ammonia or ammonium compounds existing in the sample have their nitrogen oxidized to nitric oxide or nitrogen dioxide by the catalyst.

Accordingly, all the nitrogen dioxide is converted to nitric oxide in the carbon conversion column 21. The vaporized water resulting from the aqueous sample injection is condensed by the condenser 23. Since nitric oxide is only sparingly soluble in water, whereas nitrogen dioxide is highly soluble, the location of the carbon conversion column 21 ahead of the condenser 23 prevents the loss of nitrogen oxide in the condensed water. The indicated location of the carbon conversion column ahead of the tubing connecting the columns through the condenser 23 and the nitric oxide analyzer 24 also has the advantage of averting any problem from the tendency of nitrogen dioxide to adsorb on surfaces of tubing carrying the gas to the measuring instrument 24.

After condensation of water the nitric oxide is transported through the analyzer by the carrier gas flow. Upon passage through the instrument a response occurs followed by rapid return to zero as the nitric oxide is flushed out of the measuring instrument. The instrument response is recorded on a suitable recorder 15 in the form of peaks. The peak heights are proportional to nitrogen contained in the sample.

The nitrogen analyzer 24 is calibrated in a desired range from 0 to 200 p.p.m. full scale down to 0 to 1 p.p.m. full scale. If a higher range is desired, the sample is diluted accordingly.

INORGANIC NITROGEN

Metallic nitrates and nitrites may be heat decomposed at various temperatures depending upon the species to form a metal oxide, nitric oxide and oxygen.

Figure 2:
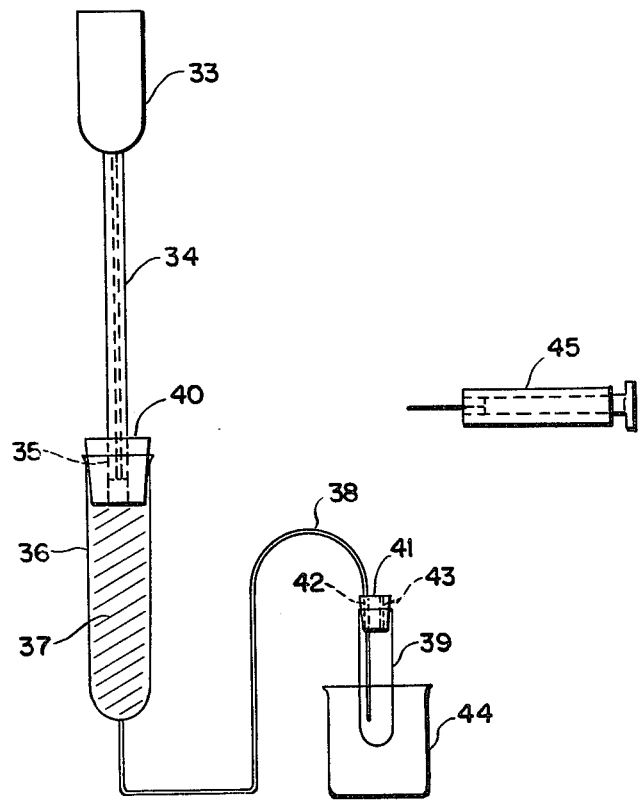
FIG. 2 is a schematic diagram of apparatus for treating a sample for subsequent measurement of nitrite-nitrate nitrogen.
Figure 3:
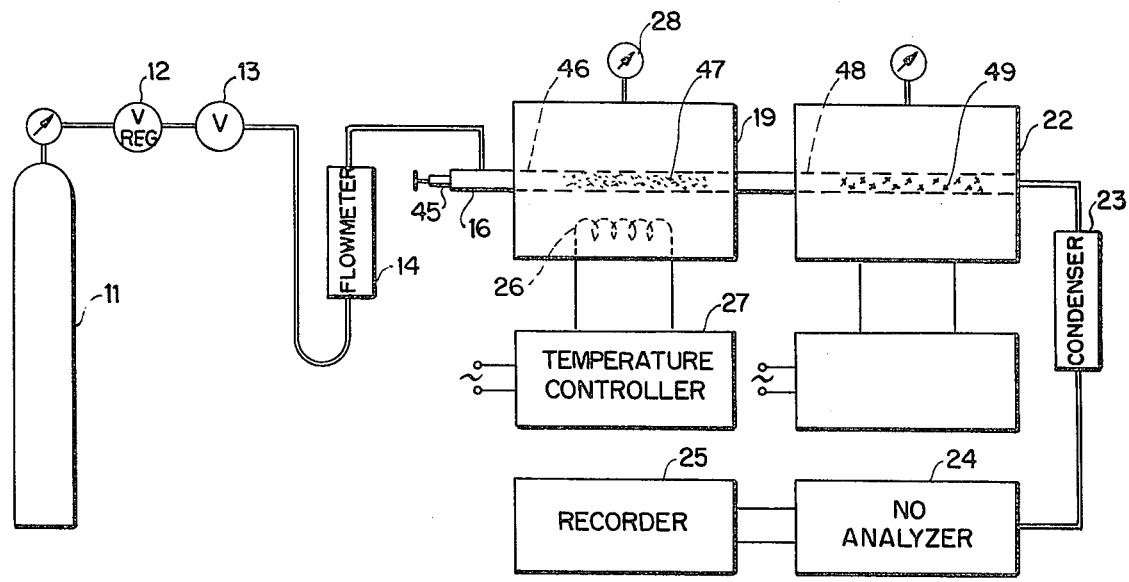
FIG. 3 is a schematic diagram of apparatus for measurement of nitrite-nitrate nitrogen.

The detection and measurement of inorganic nitrogen, metallic nitrate and nitrite nitrogen together is accomplished in steps. For this purpose apparatus such as illustrated in FIG. 2 is employed to reduce all nitrates to nitrites. Then apparatus such as illustrated in FIG. 3, physically similar to that illustrated in FIG. 1, is employed for measuring the nitrite content in terms of nitric oxide.

Reduction apparatus illustrated in FIG. 2 comprises a reservoir 33, a vertical tube 34, and a short length of capillary tubing 35. The vertical tube 34 may be approximately 25 centimeters is length and is joined to the reservoir 33. The capillary tubing 35 is joined to the lower end of the tube 34. A reduction column 36 is mounted below the capillary tube 35 and is packed with metallic cadmium 37. A flexible tube 38 is provided at the lower end of the reduction column 37 which is led into a sample collection chamber 39. The sample collection chamber 39 is provided with a two-hole stopper 41 having one opening 42 receiving the outlet end of the tubing 38 and a second opening 43. A waste container 44 is provided which is mounted below the sample collection chamber 39. A sample withdrawal syringe 45 is also provided.

The capillary tube 35 is connected with a tight joint as by means of a stopper 46 to the upper end of the reduction column 36 so that no leakage takes place in the flow of sample from the tube 34 to the column 36.

A sample containing nitrite and/or nitrate nitrogen is first prepared by mixing it with a buffer solution in fixed proportion. A typical ratio may be 100 milliliters of sample and 5 milliliters of buffer solution. Buffer solutions of pH 8.2, 8.6, or 9.6 have been found satisfactory.

The pH adjusted sample is poured into the reservoir 33 of the reduction apparatus of FIG. 2. The elevated reservoir 33 acts as a device to provide an approximately constant head on the capillary tube 35 to regulate flow at approximately 5 milliliters per minute through the reduction column 36.

A sample containing nitrites then flows out of the bottom of the reduction column 36 through the tubing 38 where it enters the bottom of the sample chamber 39. Sample then flows upward through the chamber 39 through the opening 43 and overflows into the waste container 44. For further use a sample is drawn from the sample collection chamber 39 by the syringe 45, the needle of which is inserted through the opening 43.

The sample from the syringe 45 is then treated in the apparatus of FIG. 3 to convert the nitrite to nitric oxide for measurement in a nitric oxide analyzer.

In the apparatus of FIG. 2 it has been found that flow through the cadmium reduction column 37 should be sufficiently slow so as to achieve essentially 100 percent reduction of all nitrates in the sample to nitrites. This is the reason for the capillary and elevated reservoir which regulates and maintains flow through the column at an essentially constant flow rate. It is also important that the liquid volume of the column 36 be reasonably small so that the column is flushed of a previous sample by a relatively small volume of the fresh sample. Nitrites are unstable compounds which are readily oxidized by dissolved air to nitrates. Furthermore, nitrites react with certain organic nitrogen compounds which may be present in the sample. Therefore, the arrangement is such that fresh sample is flowing through the sample collection chamber at the time of sampling, which minimizes not only exposure to air which could cause oxidation of the nitrites but also time for reaction of the nitrites with other nitrogen compounds which might be present in the sample.

While many possible configurations and dimensions are possible, the operation has been described by way of example for a system in which the metallic column reducing agent was contained in a 12 millimeter diameter column packed to a depth of about 10 centimeters. Liquid hold-up volume of this packed column is approximately 7 milliliters. The sample collection chamber is removed at the start of the operation.

It may be assumed that the reduction column is full of liquid from the previous sample reduction operation. Approximately 75 milliliters of the buffered sample is added to reservoir 33. Flor of about 25 milliliters is permitted through the apparatus to flush the column with effluent going directly from tubing 38 to waste chamber 44. A clean dry sample collection chamber 39 is installed on the stopper 41. This is then filled by the continuous flow of liquid from the reservoir 33 to the entire apparatus. Thereupon the sample is taken by the syringe 45 through the opening 43 for analysis in the apparatus illustrated in FIG. 3.

The apparatus of FIG. 3 includes structural components corresponding to those in FIG. 1. However, different packing material is employed.

There is a cylinder 11 for carrier gas under pressure with an outlet connected to tubing in which are interposed a pressure regulator 12, a flow control valve 13 and a flow meter 14. There is also a sample injection means 16 including the sample injection syringe 45. Joined to the sample injection means 16 is a packed reaction column 46 housed in the furnace 19 heated by the resistance unit 26 and controlled by a temperature controller 27.

The column 46 is packed with a suitable material 47 such as pumice which has been impregnated with a substance such as phosphoric acid for acidifying the sample. Other packing materials may be used such as quartz chips, glass beads, glass wool and so forth as the support for the phosphoric acid. The temperature controller 27 in this case is adjusted to maintain the temperature of the column 26 constant within a range between approximately 150° and 225°C.

Connected to the reaction column 46 is a second column referred to as a converter column 48 in the furnace 22. The converter column 48 is packed with vitreous carbon 49 which is maintained at 550°C in the furnace 22, which is also temperature controlled.

As in the case of FIG. 1, downstream from the converter tube 49 is a condenser 23 for removing water vapor. The same type of nitric oxide analyzer 24 may be employed as in the case of FIG. 1.

OPERATION OF INORGANIC NITROGEN CHANNEL

In operation the sample is taken by the syringe 45 from the sample collection chamber 39 and injected through the inlet 16 to the reaction column 46. Upon striking the heated phosphoric acid soaked packing 47 in the reaction column 46 the nitrites are chemically decomposed rapidly to yield dinitrogen trioxide ($N_2O_3$). This gas, in turn, rapidly decomposes to nitric oxide (NO) plus nitrogen dioxide ($NO_2$). A cloud of nitrogen oxides is produced in a continuously flowing carrier gas. Upon passage through the converter column 48 the nitrogen dioxide is converted to nitric oxide. Water vapor in the gaseous sample is condensed and removed in the condenser 23. The carrier gas then carries the resulting nitric oxide to the analyzer 24. The instrument response is in the form of peaks, recorded on the recorder 25, which are proportional to total nitrate-nitrite nitrogen content of the sample. The reactions which are pertinent to the instrumental method are listed below:

1. In the apparatus illustrated in FIG. 2, nitrate is reduced to nitrite:

a. $MeNO_3 \rightarrow MeNO_2$ (4)

where Me is a monovalent metal ion, e.g. Na or K.

b. $Me'(NO_3)_2 \rightarrow Me'(NO_2)_2$ (5)

where Me' is a divalent metal ion, e.g. Ca or Mg.

c. $Me''(NO_3)_3 \rightarrow Me''(NO_2)_3$ (6)

where Me'' is a trivalent metal ion, e.g. Al or Fe(III).

2. In the acid packed column 46 of FIG. 3, the following representative reactions are believed to take place:

a. $2MeNO_2 \xrightarrow{acid} Me_2O + N_2O_3$ (7)

b. $N_2O_3 \rightarrow NO + NO_2$ (8)

3. In converter column 48, FIG. 3:

$NO_2 \xrightarrow{heat\ catalyst} NO + \frac{1}{2} O_2$ (9)

The instrument has been found to be sensitive to various inorganic nitrates and nitrites commonly found in water. These include sodium and potassium nitrate and the nitrates of sodium, potassium, ammonium, calcium, magnesium and iron.

With the system as described, it is possible to determine separately nitrite nitrogen and nitrate nitrogen, if such is desired. A raw, that is nonreduced sample, is syringe injected and the peak resulting is due to nitrite nitrogen. A reduced sample is then analyzed, which yields a peak due to combined nitrite and nitrate nitrogen. The difference between the two peaks is due to nitrate nitrogen in the sample.

The methodology described is generally free of interferences from substances normally found in polluted waters in concentrations normally present. The technique of reducing nitrates to nitrites before colorimetric analyses has been proposed. However, nitrites and particularly nitrous acid, are reactive with certain compounds such as amines and amino acids, which would conceivably be present in some situations. Although certain industrial chemicals may cause interferences by forming condensation products with nitrites in the reaction column, this need not be considered a problem since such industrial chemicals are not likely to be present in polluted waters.

AMMONIA NITROGEN

For the detection and measurement of nitrogen existing either in ammonia or in ammonium ions of soluble inorganic salts aqueous samples are reacted with an alkaline substance which converts ammonium ion to free ammonia in solution. The dissolved ammonia is removed from the solution by heating and stripping with inert gas. The resulting gaseous ammonia is catalytically oxidized to nitric oxide and measured by a chemiluminescence analyzer sensitive to nitric oxide.

Figure 4:
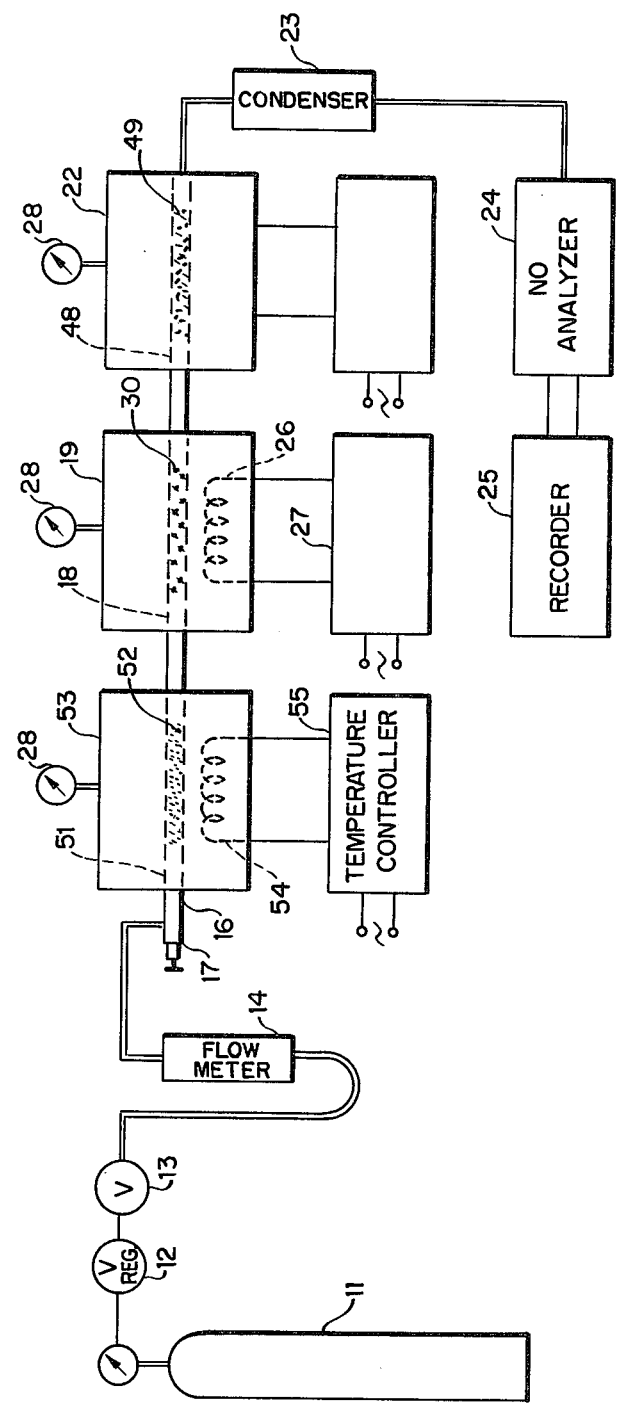
FIG. 4 is a schematic diagram of apparatus for measuring ammonia nitrogen.

As illustrated in FIG. 4, a carrier gas cylinder 11 is provided with a pressure regulator 12 and a flow control valve 13 connected through tubing in seriatim with a flow meter 14. Preferably the tank 11 contains nitrogen as a carrier gas, although an inert gas such as argon, helium or other gases may be used.

Connected to the tubing from the flow meter 14 is a reaction tube 51 packed with an alkaline substance 52. The sample injection means 16 such as described in connection with FIGS. 1 and 3 is connected to the inlet of the combustion tube 51. The combustion tube 51 may also be of quartz although other materials such as ceramics would be satisfactory.

The alkaline packing 52 may take any of several different forms. For example, asbestos impregnated by a slurry of magnesium oxide may be employed. Quartz chips of pumice coated with magnesium oxide have also been found to be satisfactory. Likewise, other materials which would give an alkaline reaction with water to a pH of approximately 8.8 to 10.0 would be satisfactory.

As in the case of FIGS. 1 and 3 a syringe 17 is employed for injection a sample into the injection end 16 of the reaction tube 51. The syringe 17 is employed for drawing a pH adjusted water sample containing ammonium salts. For heating the alkaline packing 52 a furnace 53 is employed similar to the furnace 19 of FIG. 1 having an electric heating element 54 connected to a temperature controller 55. The controller 55 is set to maintain a temperature between 120° and 200°C in the furnace 53. As low a temperature as possible is required to prevent interference from organic nitrogen compounds if such were present in the sample. Connected to the outlet of the combustion tube 51 are reaction tubes 18 and 48 similar to those described in connection with FIGS. 1 and 3. The reaction tube 18 as described in connection with FIG. 1 is packed with cupric oxide 30 and the reaction tube 48 is packed with vitreous carbon 49. As in the case of FIG. 1 the invention is not limited to the use of cupric oxide 52 as a catalyst as other catalysts such as platinum, rhodium, palladium, cobalt, oxide or nickel oxide might also be used. The temperature controller 27 is set to heat the packing 30 to a temperature between 900° and 950°C and the temperature in the furnace 22 is controlled to maintain the temperature of the virtreous carbon packing 49 at approximately 550°C.

As in the case of FIGS. 1 and 3 the outlet of the reaction tube 48 is connected by tubing through a condenser 23 to a nitric oxide analyzer 24.

OPERATION OF AMMONIA NITROGEN CHANNEL

When the ammonium salt containing sample from the syringe 17 strikes the heated alkaline packing 52 the liquid sample is rapidly evaporated. The sample reacts with the alkaline packing to form ammonium and hydroxyl ions, which react to form free ammonia and water vapor. At the same time the inert carrier gas from the tank 11 strips the free ammonia from the solution.

The carrier gas now containing a cloud of gaseous ammonia is passed over the cuprous oxide packing 30. Here the ammonia is catalytically converted to nitric oxide and possibly some is further oxidized to nitrogen dioxide. The reactions may be represented as follows:

$NH_4^+ + OH^- \xrightarrow{heat} NH_3 + H_2O$ (10)

$4NH_3 + 5O_2 \xrightarrow{heat\ catalyst} 4NO + 6H_2O$ (11)

After catalytic oxidation of the ammonia to the oxides of nitrogen, the flow continues over the vitreous carbon packing 49 wherein nitrogen dioxide is converted to nitric oxide plus oxygen gas molecules.

Although the apparatus described comprises what amounts to a progression through three separate columns with three separate packings heated by three separate furnaces, it will be understood by those skilled in the art that other combinations of columns and furnaces could be used to achieve the same flow pattern and conditions as described.

As in the case of FIGS. 1 and 3 the carrier gas leaving the combustion tube 48 passes through the condenser 23 where excess water vapor is condensed and removed. The gas is then carried to the nitric oxide analyzer 24 which as in the case of FIGS. 1 and 3 may be a chemiluminescence analyzer. In this case the recorder 25 registers peaks whose heights are proportional to the ammonia nitrogen content of the sample.

The apparatus illustrated is relatively free from interference. Substances which might interfere are those inorganics containing nitrogen which are sufficiently volatile as to be vaporized in passage through the heated alkaline packing. Low boiling volatile amines are such substances but these are not likely to be found in the anticipated applications of the instrument.

Substances containing nitrogen which will be hydrolyzed to form ammonia might interfere. One such substance is urea. If urea is anticipated as in water pollution applications, the urea is hydrolyzed prior to sampling.

Amino acids, peptides and proteins show little interference, typically not more than 2 percent of the response to ammonia for equal concentrations of nitrogen. Ammonia nitrogen is measured in all the inorganic ammonium salts likely to be found in waste water applications. These include sulfate, chloride, nitrate, carbonate and bicarbonate salts of ammonia.

UNITARY SYSTEM FOR MEASURING TYPES OF COMBINED NITROGEN OCCURRING NATURALLY AS IN MUNICIPAL WASTES AND IN FOOD PRODUCTS

For the sake of simplicity in illustrating and describing different portions of the apparatus and explaining the mode of operation of each part, the apparatus for detection and measurement of total combined nitrogen, that for detecting and measuring nitrite-nitrate constituents and that for detecting and measuring ammonia nitrogen have been illustrated and described separately.

Figure 5:
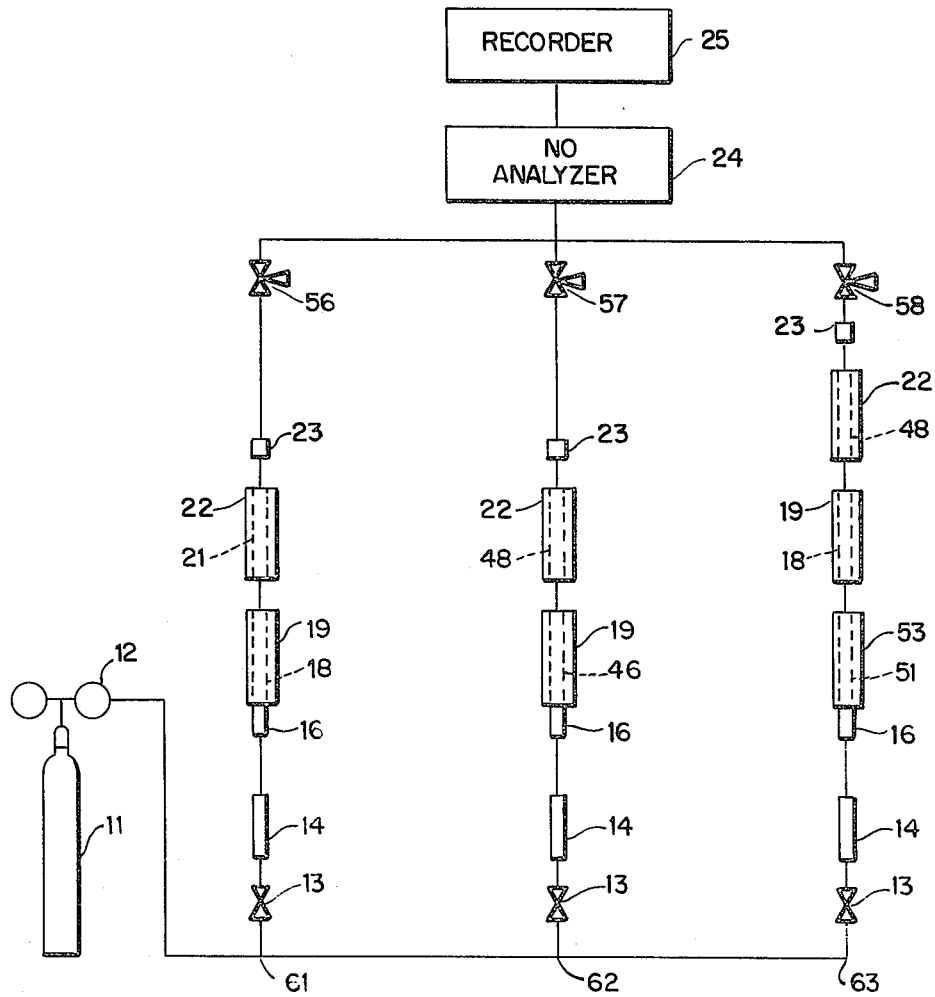
FIG. 5 is a schematic diagram of an entire system illustrating a manner of connecting co-operating analysis channels which have been shown in greater detail in FIGS. 1, 3 and 4.

However, in practice these may form channels of a unitary system as illustrated in FIG. 5 utilizing a common source 11 of carrier gas and a common nitric oxide analyzer 24 with a common recorder 25 to permit successive samples of parts of the same sample to be injected successively in each of three different channels to produce successive records in the recorder 25.

Although preferably an inert gas is utilized for a carrier the invention is not limited thereto and does not exclude using for the pressurized carrier source 11 a source of oxygen containing gas such as air or oxygen which is pressure controlled by the regulator 12. Three-way valves 56, 57 and 58 are provided for successively directing the flow from the three channels to either the detecting instrument 24 or to a vent.

In operation the samples are successively injected in the total combined nitrogen channel 61, the nitrite-nitrate nitrogen channel 62 and the ammonia nitrogen channel 63. The samples are analyzed in each channel. Analyses in the nitrite-nitrate channel 62 and on the ammonia channel 63 are taken directly. Analysis in the total combined nitrogen channel 61 is also taken. From the three analyses, organically bound nitrogen is calculated as follows:

Organic Nitrogen = total combined nitrogen − (nitrate-nitrite nitrogen + ammonia nitrogen).

Total Kjeldahl Nitrogen = total combined nitrogen − (nitrate-nitrite nitrogen).

EMBODIMENT OF THE INVENTION FOR MONITORING EFFLUENT FROM MILLS AND PLATING WORKS EMPLOYING CYANIDES

Generally speaking, in the analysis of waste waters and waste products for waste treatment or pollution control and in the analysis of food products cyanides are not encountered owing to the poisonous nature of such compounds. Consequently cyanide content has not been considered in the foregoing described analysis system and a separate channel for analysis of cyanide content has not been included.

Nevertheless, in certain industrial waste waters measurement of cyanides is very important because of the high toxicity of the cyanide ion to fish, animals and humans. In addition, the microorganisms responsible for self-purification of streams and the treatment of sewage are inhibited even by low levels of cyanides. Cyanide wastes may be found in the steel industry, from metal cleaning and electroplating processes and to certain extent from the chemical industry.

Certain portions of the previously described apparatus may also be employed with certain modifications to enable cyanides to be detected and to be measured separately from other nitrogen-containing compounds.

Cyanides in waste water exists both as simple cyanides, that is those which ionize to form the cyanide ion ($CN^-$) and those which exist as metal complexes where the CN group is part of the complex ion $M(CN)_x^{y-}$. Although the complex ions do not exhibit the toxicity of a simple cyanide ion, the complex is under certain conditions, some not well defined, converted to the simpler alkali cyanides with their toxic $CN^-$ ion. Therefore, in the measurement of cyanides it is necessary to measure not only the cyanide ion existing as simple alkali cyanides, but also those cyanides existing as a bewildering array of metal complexes.

There are standard laboratory techniques for converting simple cyanides to hydrogen cyanide. Selective ion electrodes have also been proposed for cyanide measurement. However, such electrodes will detect only cyanide ions resulting from the ionization of simple, alkali cyanides and will not respond to the cyanide tied up as a metal complex. Moreover, such detection of simple cyanides is generally limited to concentrations above about 1 p.p.m.

It is accordingly an object of this aspect of the invention to provide a simple reliable system for quickly measuring cyanide contents, whether from the simple ion or from metal complexes.

In carrying out the invention in accordance with its preferred form where the presence of a complex cyanide ion is suspected, the sample is first treated to break down the complex and the treated sample is then injected in a carrier gas stream carried through reaction tubes of the general type described in connection with analysis of samples containing nitrogen in other forms.

The pretreatment of the sample comprises breakdown of the complex by a mercuric ion and the conversion of mercuric cyanide to a readily acid decomposable cyanide salt such as magnesium cyanide.

The treated sample is then injected in a carrier gas stream and carried through a series of reaction tubes in the first of which it is acidified to form hydrogen cyanide gas from the cyanide constituents.

The sample is then carried through a reducing column to convert any nitrogen oxides to nitrogen, thereby eliminating the effect of any metallic nitrites which may have been acidified to form nitric acid.

The sample is then carried through an oxidizing column and a reducing column and into a nitric oxide analyzer as in the previously described channel for analysis of total combined nitrogen to obtain a measure of cyanides in terms of nitric oxide.

In order to test for cyanides in a sample suspected of containing cyanide tied up as metal complexes the complex in the sample is broken down by the mercuric ion. This is accomplished by treatment of the sample with a soluble mercuric salt, preferably mercuric sulfate. The resultant simple cyanide is then converted to an alkali metal cyanide which reacts with an acid to form hydrogen cyanide gas.

In the case of potassium ferricyanide the two following reactions probably take place.

First the breakdown of the complex by mercuric ion:
$$2K_3Fe(CN)_6 + 6HgSO_4 \rightarrow 6Hg(CN)_2 + 3K_2SO_4 + Fe_2(SO_4)_3 \quad (12)$$

Addition of a large excess of chloride (as magnesium chloride) results in the following:
$$Hg(CN)_2 + MgCl_2 \rightarrow HgCl_2 + Mg(CN)_2 \quad (13)$$

When the sample is acidified, hydrogen cyanide gas is evolved.
$$Mg(CN)_2 + H_3PO_4 \rightarrow 2HCN + MgHPO_4 \quad (14)$$

Figure 6:
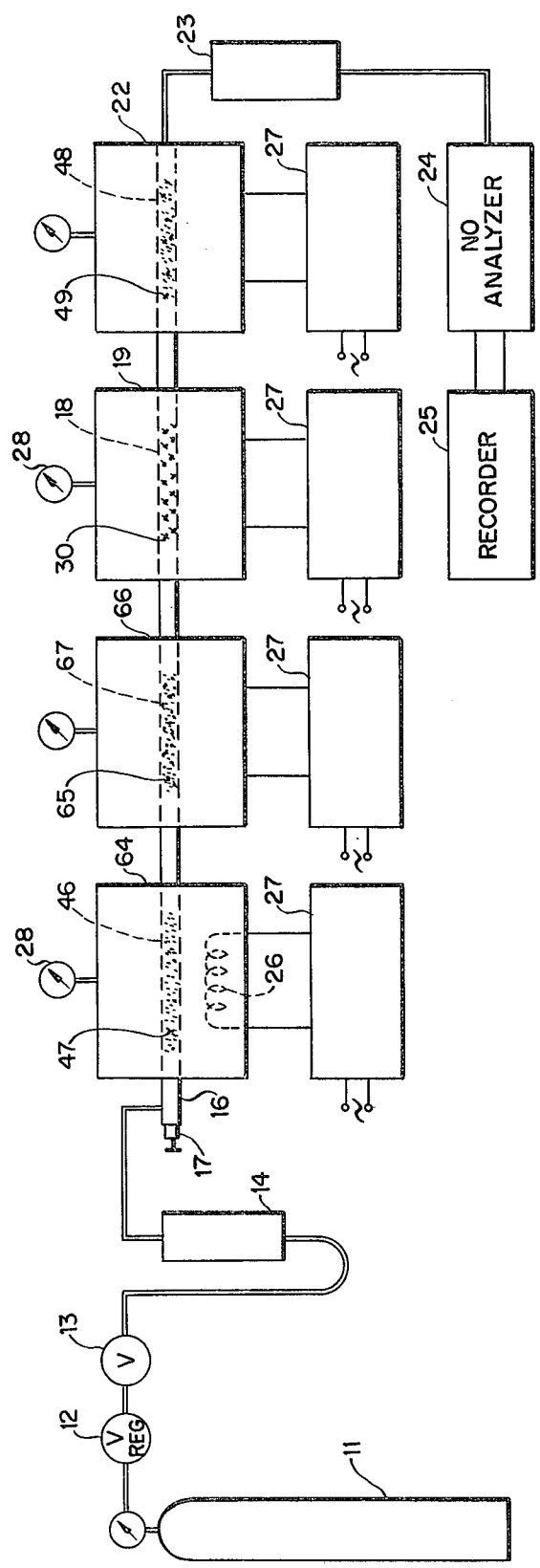
FIG. 6 is a schematic diagram of apparatus for measuring cyanide nitrogen.

After the sample has been treated to produce the simple cyanide such as magnesium cyanide, it is injected in the columns illustrated in FIG. 6.

As illustrated in FIG. 6 the apparatus for measuring cyanide content of the treated sample includes certain parts corresponding to those illustrated in the embodiment of FIGS. 1-5. These include the carrier gas cylinder 11 containing nitrogen or other inert gas such as helium, argon, carbon dioxide, etc., the pressure regulator 12, needle valve 13, flowmeter 14, sample injector 16, syringe 17 for injecting the treated sample and the various reaction tubes 46, 18 and 48, enclosed in furnaces 64, 19 and 22 respectively. In addition there is a reaction tube 65 enclosed in a furnace 66. As in the arrangement of FIG. 3, there is the reaction tube 46 packed with a suitable acidifying column 47 such as quartz chips impregnated with phosphoric acid. Also there is the final reaction tube 48 packed with a catalyst such as vitreous carbon 49 for converting nitrogen oxides for nitric oxide.

However, differing from the arrangement of FIG. 3, the reaction tube 65 is interposed following the acidifying reaction tube 46 and column 47 and the nitrogen oxide producing column 30 in the reaction tube 18 is interposed between the reaction tube 65 and the reaction tube 48.

The reaction tube 65 is packed with a material to form a reducing column such as reduced copper or other metal which will be oxidized by nitric oxide or nitrogen dioxide to form the metal oxide plus nitrogen. Typically this packing is maintained by the furnace 66 at a temperature of about between 300° and 500°C. Obviously, where the samples are known to contain no nitrite or nitrate nitrogen, reaction tube 65 and associated equipment are not required.

The furnace 64 for the phosphoric acid packing 47 is set to heat the packing to a temperature between 175° to 275°C.

OPERATION OF CYANIDE MEASUREMENT EMBODIMENT

In the arrangement illustrated, carrier gas from the cylinder 11 flows continuously through the pressure regulator 12, needle valve 13 and flowmeter 14 entering the reaction column 47 through the port in the injector 16. The treated sample from the syringe 17 strikes the phosphoric acid packing 47. Any cyanides contained in the sample are chemically converted to hydrogen cyanide gas. At the same time any nitrites would be decomposed to nitric oxide and nitrogen dioxide. These, however, are removed by the reducing packing 67 in the reaction tube 65 to form the metal oxide plus nitrogen. Hydrogen cyanide or cyanogen are unaffected by this packing.

Further downstream in the reaction tube 18 the copper oxide packing 30 catalytically oxidizes nitrogen contained in hydrogen cyanide or cyanogen to nitric oxide.

One of the breakdown compounds of some cyanide complexes which are thermally decomposed at relatively low temperature is cyanogen gas ($C_2N_2$).

The nitrogen constituents of the sample have thus been converted to nitrogen oxides, either nitrogen dioxide or nitric oxide.

As in the case of FIGS. 1-5, this gas then passes over the vitreous carbon 49 in the reaction tube 48 where all nitrogen dioxide is converted to nitric oxide. Consequently, as previously described, the gas may pass through the condenser 23 to the chemiluminescence analyzer 24 where nitric oxide is detected and measured. Readout is on the recorder 25 which in this case registers peak heights proportional to cyanide concentration in the sample.

Sample preparation requires only a minute or two and upon injection of a microliter sample onto the hot acid-packed column 47 hydrogen cyanide is released immediately and converted to nitric oxide and analyzed.

Should cyanides be present in the sample injected in the combustion tube 18 of FIG. 1 or FIG. 5, the nitrogen therein would be included in the measurement of total nitrogen or total combined nitrogen.

While particular forms of the invention have been fully illustrated and described, it will be obvious to those skilled in the art that various modifications and alterations may be made therein and it is intended to cover all such modifications and alterations as may fall within the spirit and scope of the invention.

What is claimed is:

1. An analyzer for nitrogen comprising in combination:
   means for receiving nitrogen-containing substance and converting nitrogen content to oxides,
   means for receiving such oxides and reducing the nitrogen oxides to nitric oxide, and
   a nitric oxide analyzer arranged to receive nitric oxide from said reducing means.

2. The analyzer described in claim 1 including means for directing a stream of carrier gas through the means for converting nitrogen content to oxides and the reducing means successively and means for introducing nitrogen-containing substances in solution or suspension into the means for receiving the nitrogen-containing substance in conjunction with the gas stream.

3. The analyzer described in claim 1 wherein the means for converting nitrogen content to oxides comprises a column of solid oxide particles.

4. The apparatus of claim 3 wherein the solid oxide particles comprise cupric oxide.

5. The analyzer described in claim 1 wherein the means for reducing nitrogen oxide to nitric oxides comprises a reaction tube and means for maintaining it at a temperature sufficient to reduce nitrogen dioxide to nitric oxide.

6. The analyzer described in claim 5 wherein the reaction tube is packed with vitreous carbon and maintained at a temperature of substantially 550°C.

7. The analyzer described in claim 1 wherein the means for converting to oxides comprises an acidifying means.

8. The analyzer described in claim 1 wherein the means for converting nitrogen content to oxides has the property of reacting with metallic nitrites to yield nitric oxide.

9. The analyzer described in claim 7 wherein the means for converting nitrogen content to oxides comprises a column of phosphoric acid.

10. The analyzer described in claim 1 made selective for the analysis of cyanides wherein means for receiving nitrogencontaining substance and converting nitrogen content to oxides comprises means for breaking down metal cyanide complexes to simple metal cyanides followed by an acidifier.

11. The analyzer described in claim 7 rendered selective to the analysis of cyanides wherein additional means are interposed between the acidifying means and the means for reducing nitrogen oxides to nitric oxide, said additional means comprising means which selectively reduce nitric oxides to nitrogen without affecting compounds containing both carbon and nitrogen, plus oxidizing means.

12. The analyzer described in claim 11 wherein the means for reducing selectively nitrogen oxides to nitrogen comprises a column of reduced metal.

13. The analyzer described in claim 12 wherein the column of reduced metal comprises a column of reduced copper.

14. A selective analyzer for ammonium type nitrogen in a sample comprising in combination.
means for receiving the sample and converting nitrogen content to ammonium hydroxide,
means for oxidizing the ammonium hydroxide to form oxides of nitrogen, and nitrogen oxide analysis apparatus for receiving the oxides of nitrogen.

15. A selective analyzer for ammonium type nitrogen in a sample comprising in combination:
means for receiving the sample and converting nitrogen content to ammonium hydroxide,
means for oxidizing the ammonium hydroxide to form oxides of nitrogen,
means for receiving the oxides of nitrogen and reducing nitrogen oxides to nitric oxide, and
a nitric oxide analyzer arranged to receive nitric oxide from said reducing means.

16. The analyzer as described in claim 15 wherein a condenser is interposed between the means for reducing nitrogen oxides to nitric oxide and the nitric oxide analyzer to remove water vapor formed in the oxidation of ammonium hydroxide.

17. The analyzer described in claim 15 wherein the means for converting to ammonium hydroxide comprises alkalyzing means.

18. A selective analyzer for cyanide content of a nitrogen-containing substance which has been treated to convert any complex metal cyanides in a sample to simple metallic cyanides, said analyzer comprising:
means for acidifying the treated sample to evolve gas including cyanide gas,
means for reducing any nitrogen oxide in the evolved gas to form nitrogen gas without effect on the evolved cyanide gas,
means for oxidizing the cyanide gas to form carbon dioxide and oxides of nitrogen,
means for reducing the oxides of nitrogen to nitric oxide,
and
a nitric oxide analyzer.

19. The method of measuring cyanide content of a sample suspected of containing metal complexes wherein the cyanide group is part of a complex metal cyanide ion comprising the steps of:
breaking down the complex by a mercuric ion to produce a simple cyanide,
oxidizing the cyanide to form oxidized nitrogen, and
measuring oxidized nitrogen as a measure of cyanide content.

20. The method of measuring cyanide content of a sample suspected of containing metal complexes wherein the cyanide group is part of a complex metal cyanide ion comprising the steps of:
breaking down the complex by a mercuric ion to produce a simple cyanide,
oxidizing the cyanide to form oxidized nitrogen,
reducing the oxidized nitrogen to form nitric oxide, and
measuring nitric oxide to provide a measure of cyanide content.

21. The method described in claim 20 wherein the sample is acidified to evolve cyanide gases and to evolve oxides of nitrogen if any nitrates or nitrites are present in the sample, and wherein thereafter such oxides are eliminated before oxidizing the cyanide.

22. The method described in claim 21 wherein the nitrogen oxide elimination step comprises exposing the sample to a reducing agent.

23. The method described in claim 22 wherein the reducing agent employed is a reduced metal.

24. The method described in claim 23 wherein the reduced metal is reduced copper.

25. The method of claim 20 wherein the sample is treated with an excess of chloride and thereafter acidified.

26. The method of claim 25 wherein the sample is treated with magnesium chloride to convert mercuric cyanide to magnesium cyanide before acidifying.

27. The method described in claim 20 wherein the sample is acidified by injecting upon hot phosphoric acid.

28. The method described in claim 20 wherein the mercuric ion is introduced by treating the sample with a soluble mercuric salt.

29. The method described in claim 28 wherein the soluble mercuric salt employed is mercuric sulfate.

30. An analyzer for nitrogen in substances in solution or suspension comprising in combination a plurality of channels having a common source of carrier gas and a common analyzer sensitive to nitric oxide, each channel having an initial reaction tube with means for injecting a sample therein and means for maintaining the reaction tube at an elevated temperature followed by a reaction tube for reducing oxides of nitrogen to nitric oxide, the channels including a total combined nitrogen channel in which the initial reaction tube is packed with oxidizing means to convert the sample to oxides of nitrogen and is before the reaction tube for reducing oxides of nitrogen to nitric oxide, a second channel for detection of metallic nitrites including an initial reaction tube packed with means for acidifying the sample and which is before the reaction tube for reducing oxides of nitrogen to nitric oxide and a third channel for detecting ammonia nitrogen in which there is a reaction tube packed with means for alkalyzing the sample to drive off ammonia followed by a reaction tube packed with oxidizing means to convert the sample to oxides of nitrogen and which is mounted before the reaction tube for reducing oxides of nitrogen to nitric oxide.

31. The analyzer described in claim 30 wherein the oxidizing means comprises cupric oxide as an active ingredient.

32. The analyzer described in claim 31 wherein the oxidizer comprises a reaction tube packed with cupric oxide particles.

33. The analyzer described in claim 30 wherein the acidifying means comprises phosphoric acid.

34. The analyzer described in claim 33 wherein the acidifying means comprises a reaction tube packed with particles coated with phosphoric acid.

35. The analyzer described in claim 30 wherein the alkalyzing means comprises magnesium oxide.

36. The analyzer as described in claim 35 wherein the alkalyzing means comprises a reaction tube packed with particles of magnesium oxide.

37. The analyzer described in claim 35 wherein the alkalyzing means is followed by oxidizing means.

38. The analyzer as described in claim 30 wherein the reducing means comprises vitreous carbon.

39. The analyzer described in claim 38 in which the reducing means comprises a reaction tube packed with vitreous carbon.

40. An analyzer for total combined nitrogen in a fluid sample comprising an oxidizer with an inlet for receiving carrier gas in the oxidizer in conjunction with the sample,
a reducer connected to the oxidizer for converting oxides of nitrogen to nitric oxide and a nitric oxide analyzer connected to the reducer.

41. The analyzer described in claim 40 wherein the oxidizer comprises cupric oxide.

42. The analyzer described in claim 41 wherein the oxidizer comprises a reaction tube packed with cupric oxide.

43. The analyzer described in claim 40 wherein the reducer comprises a reaction tube with means for maintaining it at a temperature exceeding 1,000°C.

44. An analyzer as described in claim 40 wherein the reducer comprises a reaction tube packed with vitreous carbon and means for maintaining the tube at a temperature of approximately 550°C.

45. An analyzer for nitrites and nitrates contained in a fluid sample comprising an acidifier with an inlet for carrier gas to carry reaction products of the sample through the acidifier, and means for converting the acidified sample and forming oxidized nitrogen, means for reducing oxides of nitrogen to nitric oxide and a nitric oxide analyzer.

46. An analyzer as described in claim 45 including a reducer connected to the acidifier for converting oxides of nitrogen to nitric oxide and a nitric oxide analyzer connected to the reducer.

47. An analyzer as described in claim 46 wherein the acidifier comprises a body of phosphoric acid.

48. An analyzer as described in claim 47 wherein the acidifier comprises a reaction tube packed with particles coated with phosphoric acid.

49. An analyzer as described in claim 46 wherein the reducer comprises a reaction tube with means for maintaining it at a temperature in excess of 1,000°C.

50. An analyzer as described in claim 46 wherein the reducer comprises a reaction tube packed with vitreous carbon and means for maintaining the combustion tube at a temperature of approximately 550°C.

51. An analyzer for ammonia nitrogen contained in a fluid sample comprising:
a column containing an alkalyzer, the column having an inlet with means for receiving gas under pressure to carry reaction products of the sample through the alkalyzer,
means for oxidizing the reaction products of the sample to oxides of nitrogen, and
means for reducing oxides of nitrogen to nitric oxide for analysis.

52. An analyzer as described in claim 51 wherein the alkalyzer comprises magnesium oxides.

53. An analyzer as described in claim 52 wherein the column comprises a reaction tube packed with particles of magnesium oxide.

54. An analyzer as described in claim 51 wherein an oxidizer is connected to the alkalyzer column to convert the output of the alkalyzer column to oxides of nitrogen.

55. An analyzer as described in claim 54 wherein the oxidizer comprises a reaction tube packed with cupric oxide.

56. An analyzer as described in claim 54 wherein a reducer is connected to the oxidizer and provided with means for maintaining the reducer at a sufficient temperature to convert oxides of nitrogen to nitric oxide.

57. The method of measuring cyanide content of a sample suspected of containing metal complexes wherein the cyanide group is part of a complex metal-cyanide ion, comprising the steps of:
breaking down the complex by an ion reactive to produce a simple cyanide,
oxidizing the cyanide to form oxidized nitrogen,
eliminating reaction products of metallic nitrite or nitrate salts, and
measuring remaining oxidized nitrogen as a measure of cyanide content.

58. The method of measuring cyanide content of a sample suspected of containing metal complexes wherein the cyanide group is part of a complex metal-cyanide ion, comprising the steps of:
breaking down the complex by an ion reactive to produce simple cyanide,
oxidizing the cyanide to form oxidized nitrogen,
eliminating reaction products of a metallic nitrite or nitrate salts, reducing oxidized nitrogen remaining after elimination of reaction products of metallic nitrite or nitrate salts, and measuring nitric oxide to provide a measure of cyanide content.

59. The method of detecting and measuring nitrogen content in a sample of substances in solution or suspension which comprises:

exposing the sample to an oxidizing agent at elevated temperatures to convert the sample to oxides of nitrogen, carrying the oxides in a gas stream, reducing the oxides of nitrogen to nitric oxide, and measuring nitric oxides.

60. The method of claim 59 wherein the sample is exposed to cupric oxide.

61. The method of claim 59 wherein the sample is exposed to an oxidizing catalyst.

62. The method of claim 59 wherein the step of converting oxides of nitrogen to nitric oxide comprises subjecting the gas stream to a temperature at or above approximately 1,000°C.

63. The method described in claim 59 wherein the step of converting nitrogen oxides to nitric oxide comprises passing the gas stream over a reducing catalyst.

64. The method described in claim 59 wherein the step of converting nitrogen oxides to nitric oxide comprises the step of passing the gas stream over vitreous carbon at an operating temperature of approximately 550°C.

65. The method of claim 59 which comprises the step of acidifying the sample.

66. The method of claim 65 wherein the sample is passed over phosphoric acid.

67. The method of claim 66 wherein the sample is subjected to a temperature in the range between approximately 150° and 225°C while passing it over phosphoric acid.

68. The method of claim 65 wherein metallic nitrates in the sample are first converted to nitrites before acidifying the sample to enable total metallic nitrates and nitrites to be measured in terms of nitric oxide.

69. The method of claim 59 wherein the sample is alkalyzed.

70. The method of claim 69 wherein the sample is passed through magnesium oxide.

71. The method of claim 70 wherein the sample is subjected to a temperature of between approximately 150° and 200°C while passing through the magnesium oxide.

72. The method of claim 69 wherein subsequent to alkalization the sample is converted to oxides of nitrogen.

* * * * *